(12) United States Patent
Kim et al.

(10) Patent No.: US 7,555,629 B2
(45) Date of Patent: Jun. 30, 2009

(54) MEMORY CARD PROVIDING HARDWARE ACCELERATION FOR READ OPERATIONS

(75) Inventors: Kyong-Ae Kim, Suwon-si (KR);
Jong-Yeol Park, Goyang-si (KR);
Dong-Hee Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 391 days.

(21) Appl. No.: 11/321,870

(22) Filed: Dec. 30, 2005

(65) Prior Publication Data
US 2006/0268609 A1 Nov. 30, 2006

(30) Foreign Application Priority Data
May 24, 2005 (KR) ............... 10-2005-0043779

(51) Int. Cl.
*G06F 12/00* (2006.01)

(52) U.S. Cl. ............... 711/217; 711/103; 711/115; 711/218; 365/185.11; 365/230.01

(58) Field of Classification Search ............... 711/103, 711/115, 217, 218; 365/185.11, 230.01
See application file for complete search history.

(56) References Cited

U.S. PATENT DOCUMENTS

| | | | | |
|---|---|---|---|---|
| 4,527,232 A | * | 7/1985 | Bechtolsheim | 711/206 |
| 5,452,261 A | * | 9/1995 | Chung et al. | 365/233.11 |
| 6,131,139 A | | 10/2000 | Kikuchi et al. | |
| 6,396,744 B1 | * | 5/2002 | Wong | 365/185.25 |
| 2002/0184436 A1 | * | 12/2002 | Kim et al. | 711/103 |
| 2003/0200413 A1 | | 10/2003 | Gurumoorthy et al. | |
| 2004/0205301 A1 | | 10/2004 | Hara et al. | |

FOREIGN PATENT DOCUMENTS

| | | |
|---|---|---|
| JP | 09-213064 | 8/1997 |
| JP | 11-039450 | 1/1999 |
| JP | 2004-318940 | 11/2004 |
| KR | 1999-0013323 | 2/1999 |
| KR | 1020060049355 A | 5/2006 |

OTHER PUBLICATIONS

Tanenbaum, A. S. Structured Computer Organization. 1984. Prentice Hall Inc. 2nd ed. pp. 10-12.*
German Patent Office, Office Action dated Apr. 2, 2009.

* cited by examiner

*Primary Examiner*—Sanjiv Shah
*Assistant Examiner*—Arpan Savla
(74) *Attorney, Agent, or Firm*—Volentine & Whitt, PLLC

(57) ABSTRACT

A memory card comprises a memory controller connected to a non-volatile memory module. The memory controller comprises a first circuit adapted to convert a first external address into a first internal address using a program stored in an internal memory. The memory controller further comprises a hardware accelerator adapted to generate a second internal address based on the first internal and external addresses.

13 Claims, 8 Drawing Sheets

US 7,555,629 B2

MEMORY CARD PROVIDING HARDWARE ACCELERATION FOR READ OPERATIONS

BACKGROUND OF THE INVENTION

1. Field of the Invention

The present invention relates generally to a memory card including a flash memory module. More particularly, the invention relates to a memory card incorporating a hardware accelerator to improve the performance of read operations performed by the memory card.

2. Description of Related Art

Memory cards are commonly used to store and access information in digital devices such as personal digital assistants (PDAs), portable audio devices, cellular phones, and personal computers. A typical memory card comprises a nonvolatile memory and a corresponding memory controller providing an interface between the memory card and a host system.

Various memory cards are disclosed, for example, in U.S. Patent Publications Nos. 2004-0205301 and 2004-0236909, and U.S. Pat. No. 6,131,139.

FIG. 1 is a block diagram showing a general layout of a memory card 100 connected to a host system 200. Referring to FIG. 1, memory card 100 comprises a flash memory module 120 and a memory controller 140. Host system 200 communicates with flash memory module 120 through memory controller 140. In particular, host system 200 may perform read, program, and erase operations on flash memory module 120 through memory controller 140.

Memory cells in flash memory module 120 are organized into blocks and pages. Each block generally comprises one or more pages and each page generally comprises a plurality of memory cells for storing a specified number of bytes. For example, a one (1) gigabyte (GB) NAND flash memory module may be organized into 8192 blocks, where each block comprises 32 pages, and each page stores 512 bytes of data.

In flash memory module 120, data is read or programmed a page at a time, and erased a block at a time. Accordingly, whenever host system 200 performs a read or program operation on flash memory module 120, a page of data is transferred to or from flash memory module 120.

The performance of read, program, and erase operations in flash memory module 120 can be improved by increasing the size of each block. In addition, increasing the block size can also reduce the chip size of flash memory module 120 by reducing the amount of peripheral circuitry per byte required to control each block. The block size is generally increased by increasing either the number of pages in each block, or the number of bytes in each page.

FIG. 2 shows two blocks with different block sizes: a "small block" and a "large block". The small block comprises 32 pages, each having a page size of 512 bytes (B). The pages are arranged in 32 rows, with each row representing a single page. The large block, on the other hand, comprises 64 pages, each having a page size of 2 kilobytes (KB). The pages in the large block are arranged in 64 rows, where each row stores a single 2 KB page. However, to simplify FIG. 2, not all 64 pages are shown.

Within the large block, each 2 KB page can be divided into four (4) "small pages" of 512 bytes each. The small pages in the large block can be accessed by specifying a row and a start column (indicated by arrows) in the large block. In this written description, the term "small page" is used to indicate a section of a large block having the same size as a page in a small block.

The respective sizes of the small and large blocks in FIG. 2 are used merely as examples. In practice, the number and sizes of pages in the small and large blocks can vary. However, a small block generally has at least one dimension that is smaller than a corresponding dimension in a large block, and page addresses in small blocks can be mapped onto page addresses in large blocks. In this written description, addresses in small blocks are referred to as "small block addresses", and addresses in large blocks are referred to as "large block addresses".

Both small block addresses and large block addresses include a memory block address and a page address. The memory block address indicates a block in flash memory module 120 where the address is located, and the page address indicates a page in flash memory 120 where the address is located.

To illustrate a logical mapping between a small block and a large block, the pages in the small block are labeled 0P through 31P. A large arrow is included in FIG. 2 to show the correspondence between logical addresses in the small block and physical addresses in the large block. Such a logical mapping may be required, for example, where host system 200 is designed to access data using small block addresses, yet the flash memory module 120 is accessed using large block addresses. In other words, if host system 200 sends memory controller 140 a small block address, memory controller 140 must convert the small block address into a large block address in order to access flash memory module 120.

For instance, suppose host system 200 sends a read command to memory controller 140 with an address for a page 1P in the small block. Memory controller 140 must convert the address for page 1P into a physical address in the large block. As shown in FIG. 2, page 1P is located at row 1, column 0 of the small block, and row 0, column 1 of the large block.

Unfortunately, the address conversion requirement slows down read operations in flash memory module 120, thereby degrading the overall performance of the memory card.

SUMMARY OF THE INVENTION

According to one embodiment of the present invention, a memory card comprises a memory controller adapted to receive a first command and a first external address from a host system. The memory controller comprises a first circuit adapted to convert the first external address into a first internal address using a program stored in the first circuit and a second circuit adapted to generate a second internal address based on the first internal address and the first external addresses and in response to activation of a read signal and an acceleration enable signal. The memory card further comprises a flash memory module adapted to access pages of data according to the first and second internal addresses. In the memory card, the first circuit sets a hardware acceleration flag in the second circuit after the flash memory module accesses a page of data for a read operation using the first internal address, and the second circuit activates the read signal whenever the memory controller receives a read command from the host system.

According to another embodiment of the invention, a memory controller for a non-volatile memory device comprises an internal memory adapted to store a program, a micro controller unit adapted to process a first external address using the program to produce a first internal address, a hardware accelerator adapted to process a second external address based on the first external and the first internal address to generate a second internal address, a host interface adapted to interface between the micro controller and hardware accelerator and a host system, and a memory interface adapted to interface between the micro controller and hardware accelerator and the non-volatile memory.

According to still another embodiment of the present invention, a non-volatile memory card comprises a memory controller comprising a micro controller unit adapted to process a first external address using a stored program to produce a first internal address, and a hardware accelerator adapted to process a second external address based on the first internal and external addresses. The memory card further comprises a host interface adapted to interface between the memory controller and a host system, and a memory interface adapted to interface between a non-volatile memory device and the memory controller.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

Figure 1:
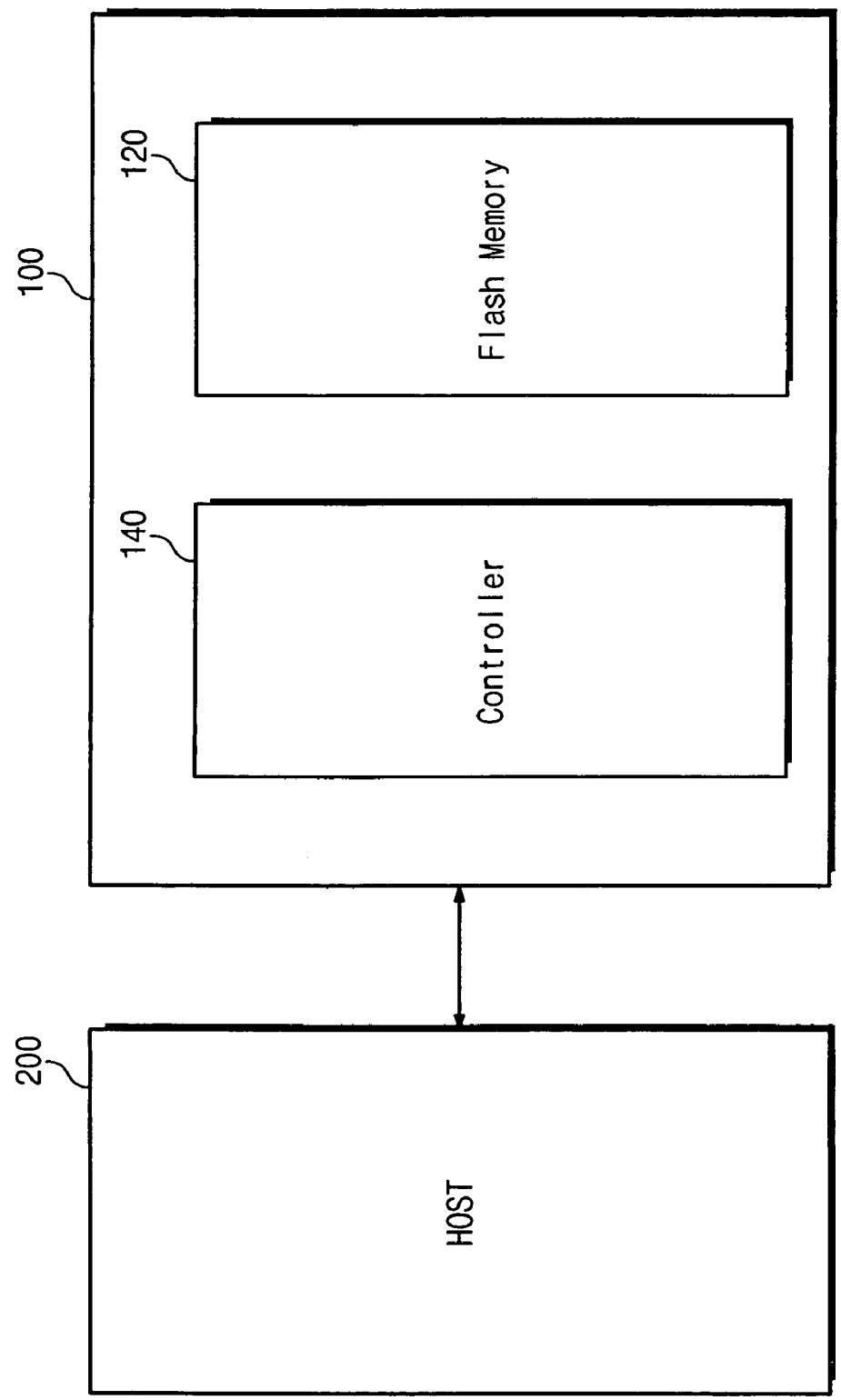
FIG. 1 is a block diagram showing a general layout of a memory card connected to a host system.
Figure 2:
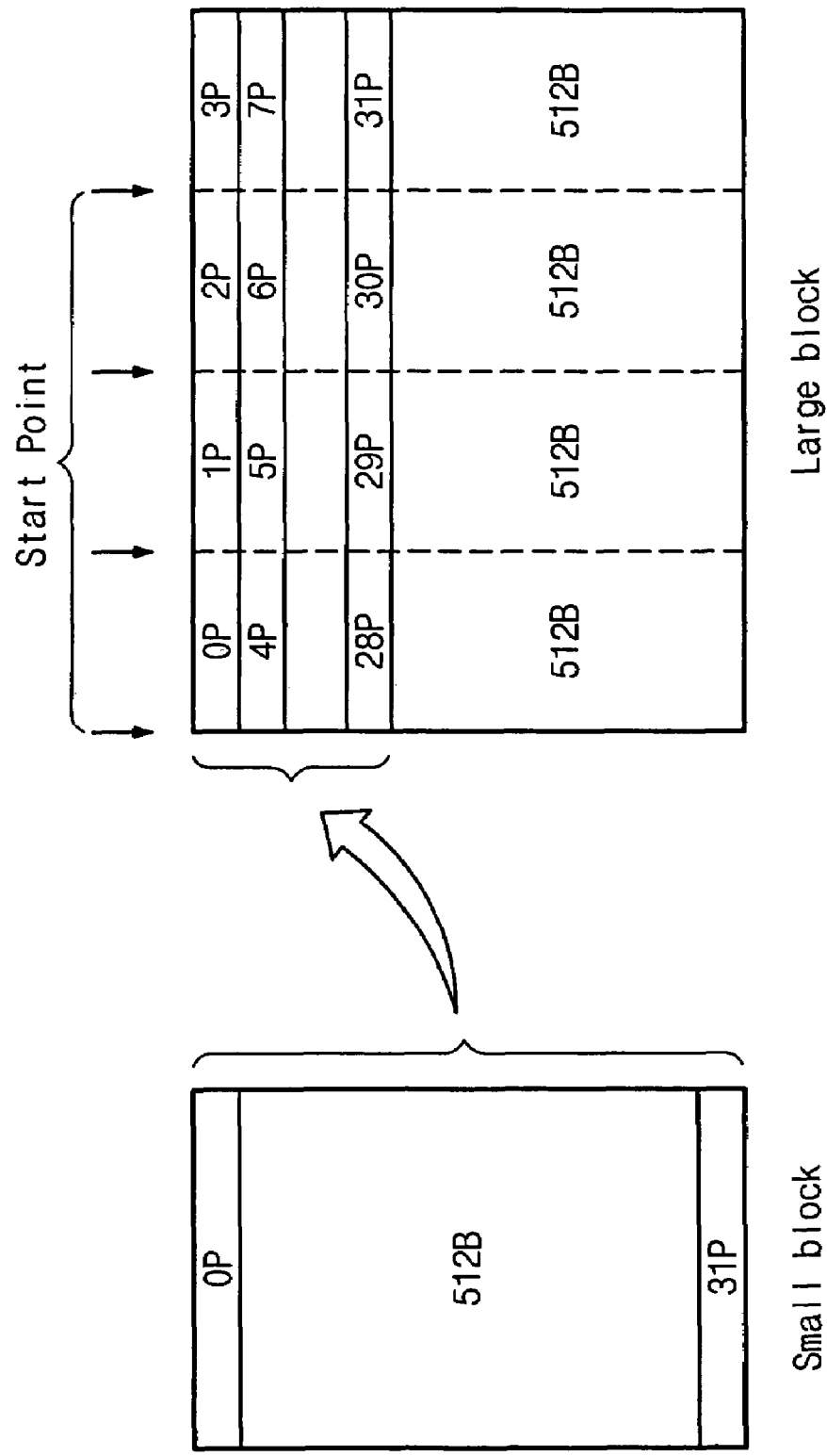
FIG. 2 is a diagram illustrating a logical mapping of pages in a small block flash memory module and a large block flash memory module.
Figure 3:
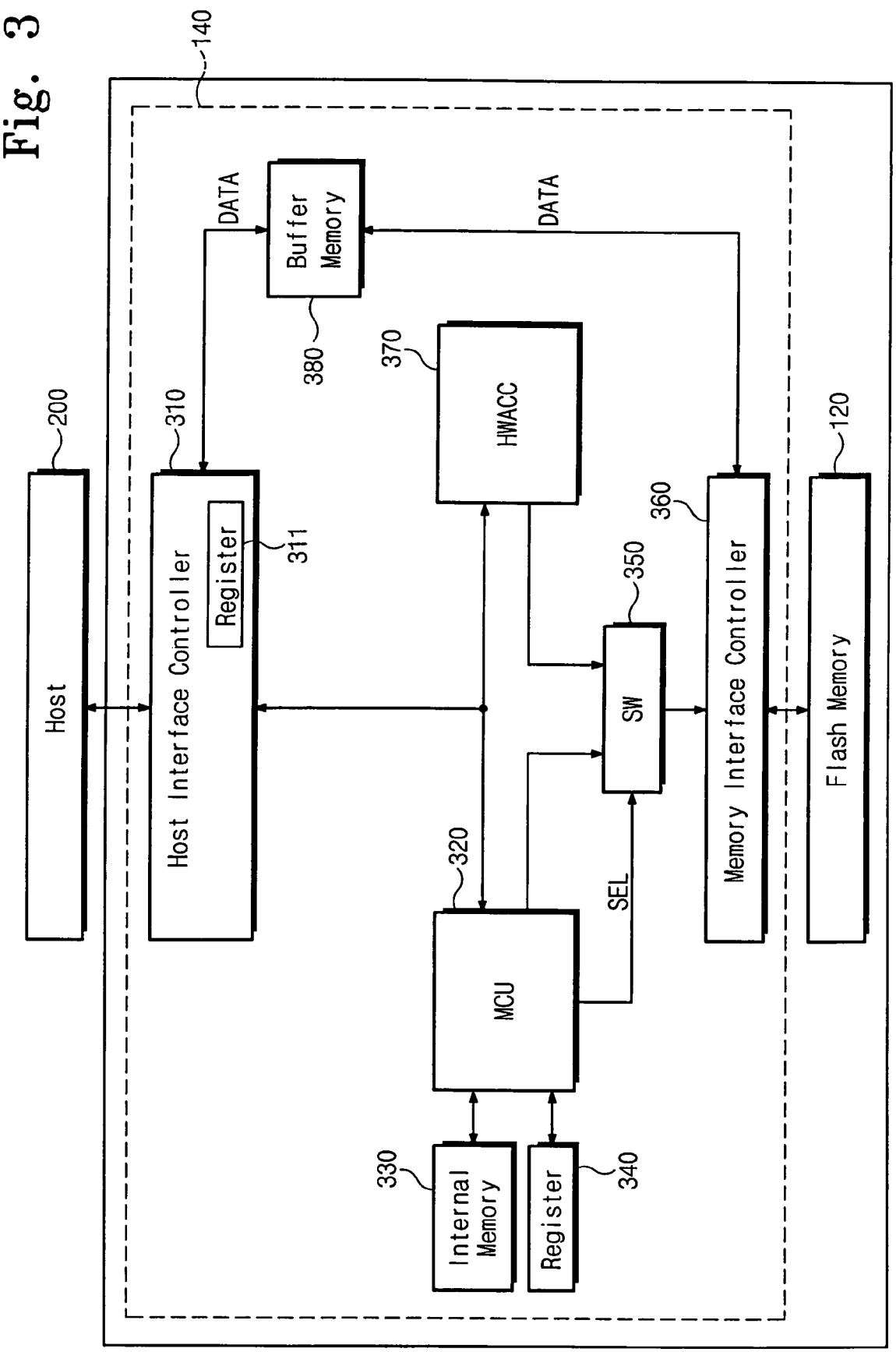
FIG. 3 is a block diagram of a memory controller according to an embodiment of the present embodiment.

FIG. 3 is a block diagram illustrating memory controller 140 according to an embodiment of the present invention. Referring to FIG. 3, memory controller 140 comprises a host interface controller 310, a micro controller unit (MCU) 320, an internal memory 330, a register 340, a switch 350, a memory interface controller 360, a hardware accelerator 370, and a buffer memory 380.

Host system 200 sends input commands and addresses to memory controller 140 using small block addresses and flash memory module 120 is accessed using large block addresses. Accordingly, memory controller 140 must convert the small block addresses provided by host system 200 into large block addresses to access flash memory module 120. Where the input command is incompatible with flash memory module 120, memory controller 140 must also covert the input command into an output command compatible with flash memory module 120.

In this written description, the term "external address" will be used to refer to small block addresses sent from an external source, such as host system 200, to memory controller 140, and the term "internal address" will be used to refer to large block addresses sent from memory controller 140 to flash memory module 120.

An external or internal address generally comprises a memory block address and a page address. An external address may further comprise start and end page addresses to indicate a range of pages to be accessed by a sequential read operation. In addition, the internal address may also comprise a start column indicating the location of a small page within a large block in flash memory module 120.

Host system 200 generally sends three types of input commands to memory controller 140: write commands, sequential read commands, and random read commands. A write command initiates a write operation to program a small page in flash memory module 120; a sequential read command initiates a sequential read operation to read a sequence of small pages from flash memory module 120; and a random read command initiates a random read operation to read a single small page from flash memory module. The write and random read commands both use a single address and they access a single page of data in flash memory module 120. In contrast, the sequential read command uses a single address, but it specifies a range of pages with start and end page addresses to potentially access more than one small page in flash memory module 120.

When host system 200 sends a read command to memory controller 140, memory controller 140 assumes either a sequential read operating mode or a random read operating mode, depending on whether the read command is a sequential read command or a random read command. Depending on the operating mode of memory controller 140, hardware accelerator 370 performs differently, as will be described below.

Host system 200 communicates with memory controller 140 via host interface controller 310. Host interface controller 310 contains a command/address register 311, which stores an input command and an external address received from host system 200. Command/address register 311 also stores an interrupt flag used to control various operations of memory controller 140. Although command/address register 311 is shown in host interface controller 310 in FIG. 3, command/address register 311 could also be placed outside host interface controller 310. Command/address register 311 may comprise more than one register.

The interrupt flag in command/address register 311 is used to control whether or not memory controller 140 uses hardware accelerator 370 to generate an internal address for a read operation. Where the interrupt flag is "set" during the course of a read or write operation, MCU 320 generates a first internal address and a first output command for flash memory module 120. Otherwise, where the interrupt flag is not set, hardware accelerator 370 generates a second internal address and a second output command for flash memory module 120 based on the external address.

The terms "set" and "clear" denote operations whereby a bit or bits comprising a logical flag are switched to obtain different states of the flag. For instance, the interrupt flag is "set" whenever command/address register 311 receives a write command. Similarly, the interrupt flag is also set whenever command/address register 311 receives a read command to be performed without converting a small block address using hardware accelerator 370. The interrupt flag is "cleared" upon completion of a write or read operation, or upon reading a first small page in a sequential read operation.

Whenever the interrupt flag is set, MCU 320 fetches the external address and the input command from command/ address register 311. MCU 320 then converts the external address into the first internal address and generates the first output command. This conversion is generally accomplished by a program stored in internal memory 330. Upon completing the conversion, the first internal address and first output command are transferred to switch 350 as first command/address data.

Where the interrupt flag is not set, hardware accelerator 370 generates the second internal address and second output command as second command/address data.

Whenever hardware accelerator 370 generates the second internal address, MCU 320 does not convert the external address into the first internal address. This allows memory controller 140 to increase the speed of read operations by avoiding the time required to run the conversion program.

Switch 350 receives the respective first and second command/address data from MCU 320 and hardware accelerator 370 and selects one of the first command/address data to output to memory interface controller 360 based on a selection signal SEL output by MCU 320. Where the interrupt flag is set, selection signal SEL causes switch 350 to output the first command/address data, and where the interrupt flag is cleared, selection signal SEL causes switch 350 to output the second command/address data.

Whenever MCU 320 converts the external address into the first internal address, the first internal address and the external address are transferred to hardware accelerator 370, where they are respectively stored as a "previous internal address" and a "previous external address". Hardware accelerator 370 uses the previous internal and external addresses to generate subsequent internal addresses.

Whenever MCU 320 performs an address conversion, it modifies a hardware acceleration flag in hardware accelerator 370. When the address conversion is for a read command, MCU 320 sets the hardware acceleration flag, and where the address conversion is for a write command, MCU 320 clears the hardware acceleration flag. Where MCU 320 does not perform an address conversion (i.e., where the interrupt flag is cleared), the hardware acceleration flag is not modified.

Memory interface controller 360 receives the first or second command/address data transferred through switch 350 and outputs the first or second command/address data to flash memory module 120. Flash memory module 120 typically comprises NAND flash memory, and therefore memory interface controller 360 generally uses conventional NAND interface timing to communicate with flash memory module 120.

Memory interface controller 360 transfers data to and from buffer memory 380 and flash memory module 120 in response to the command/address data received through switch 350. Accordingly, buffer memory 380 may be alternately controlled by command/address data from MCU 320 and hardware accelerator 370.

Where the hardware acceleration flag is set, hardware accelerator 370 generates a second internal address and an output command based on the previous internal and external addresses. For example, where a current command is a random read command and the hardware acceleration flag is set, hardware accelerator 370 compares a current external address in command/address register 311 with the previous external address and determines whether the memory block address in the current external address is the same as that in the previous external address. In addition, hardware accelerator 370 also compares whether the page address of the current external address is between the start and end page addresses of the previous external address.

Where the memory block addresses of the current and previous external addresses are the same and the page address of the current external address is between the start and end page addresses of the previous external address, hardware accelerator 370 generates the second internal address based on the current and previous external addresses and the previous internal address. The second internal address and a corresponding output command are then transferred to memory interface controller 360 through switch 350.

Where the memory block addresses of the current and previous external addresses are not the same, or the page address of the current external address is not between the start and end page addresses of the previous external address, hardware accelerator 370 sets the interrupt flag in command/address register 311. Setting the interrupt flag in this way forces MCU 320 to convert the current external address into the first internal address.

Figure 4:
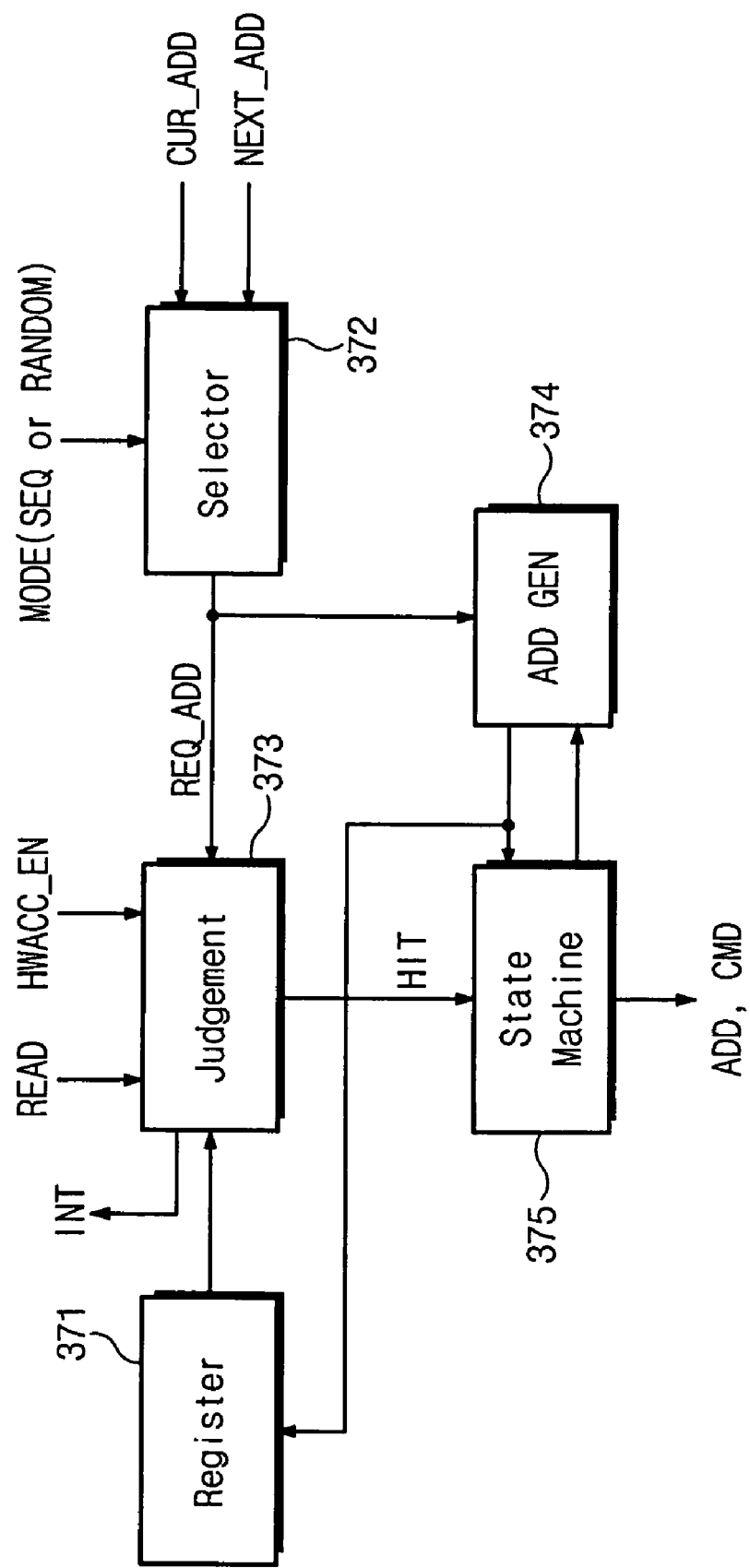
FIG. 4 is a block diagram of a hardware accelerator shown in FIG. 3.

FIG. 4 shows a block diagram of hardware accelerator 370 according to an embodiment of the present invention. Referring to FIG. 4, hardware accelerator 370 comprises a register 371, a selector circuit 372, a judgment circuit 373, an address generator 374, and a state machine 375.

Register 371 stores a reference address used to determine whether the second internal address can be generated based on a new address REQ_ADD. The reference address is compared with new address REQ_ADD, and where these addresses are "sufficiently similar", hardware accelerator 370 generates the second internal address based on new address REQ_ADD.

The reference address in register 371 is typically initialized with a first external address received from MCU 320 after address conversion is performed on the first external address. The first external address is also used to initialize an address stored in address generator 374.

Address generator 374 computes a next address NEXT_ADD in response to a control signal from state machine 375 and outputs next address NEXT_ADD to register 371. Next address NEXT_ADD is typically computed by incrementing the page address of the address stored in address generator 374. However, when memory controller 140 is in the random read operating mode, a current external address CUR_ADD input to selector 372 is generally passed through address generator 374 and output as next address NEXT_ADD. Current external address CUR_ADD is an external address currently stored in command/address register 311.

Next address NEXT_ADD, new address REQ_ADD, and the reference address are all updated in such a way that new address REQ_ADD represents an updated address relative to the reference address. For example, next address NEXT_ADD could be updated before new address REQ_ADD is compared to the reference address in judgment circuit 373, and the reference address could be updated with next address NEXT_ADD after the same comparison in judgment circuit 373.

Selector circuit 372 receives next address NEXT_ADD and current external address CUR_ADD and selects and outputs either next address NEXT_ADD or current external address CUR_ADD based on a mode selection signal MODE indicating either the sequential read operating mode or the random read operating mode. Where mode selection signal MODE indicates the sequential read operating mode, selector circuit 372 selects and outputs next address NEXT_ADD. Otherwise, where mode signal MODE indicates the random read operating mode, selector circuit 372 selects and outputs current external address CUR_ADD. Judgment circuit 373 and address generator 374 both receive new address REQ_ADD.

Judgment circuit 373 operates in response to an acceleration enable signal HWACC_EN and a read signal READ.

Where acceleration enable signal HWACC_EN and read signal READ are activated, judgment circuit 373 compares new address REQ_ADD to the reference address stored in register 371. In other words, judgment circuit 373 compares current external address CUR_ADD or next address NEXT_ADD with a previous external address.

Hardware accelerator 370 activates acceleration enable signal HWACC_EN whenever the hardware acceleration flag is set. The hardware acceleration flag is set whenever a previous command from host system 200 is a read command. For example, whenever MCU 320 performs address conversion for a read command, it sets the hardware acceleration flag so that acceleration enable signal HWACC_EN is activated. On the other hand, the hardware acceleration flag is cleared to inactivate whenever the previous command from host system 200 is a write command.

Read signal READ is activated whenever the current command stored in command/address register 311 is a read command. Accordingly, judgment circuit 373 is activated whenever the previous and current commands from host system 200 are read commands.

When judgment circuit 373 is activated, it compares new address REQ_ADD with the reference address stored in register 371. Judgment circuit 373 determines whether new address REQ_ADD has the same memory block address as the reference address, and whether new address REQ_ADD has a page address between start and end page addresses of the reference address. Where the reference address has the same memory block address as new address REQ_ADD and the page address of new address REQ_ADD is between the start and end page addresses of the reference small block address, judgment circuit 373 activates a hit signal HIT. Otherwise, judgment circuit 373 inactivates hit signal HIT and generates an interrupt signal INT, which causes the interrupt flag in command/address register 311 to be set.

State machine 375 generates a large block address and an output command in response to the activation of hit signal HIT. The second internal address is generated based on next address NEXT_ADD which is output from address generator 374 and which is not an address increased by address generator 374, but an address updated by an output from selector circuit 372 combined with a representation of previous internal and external addresses stored in state machine 375. The second internal address and the output command from state machine 375 are then transferred to memory interface controller 360 through switch 350.

Figure 5:
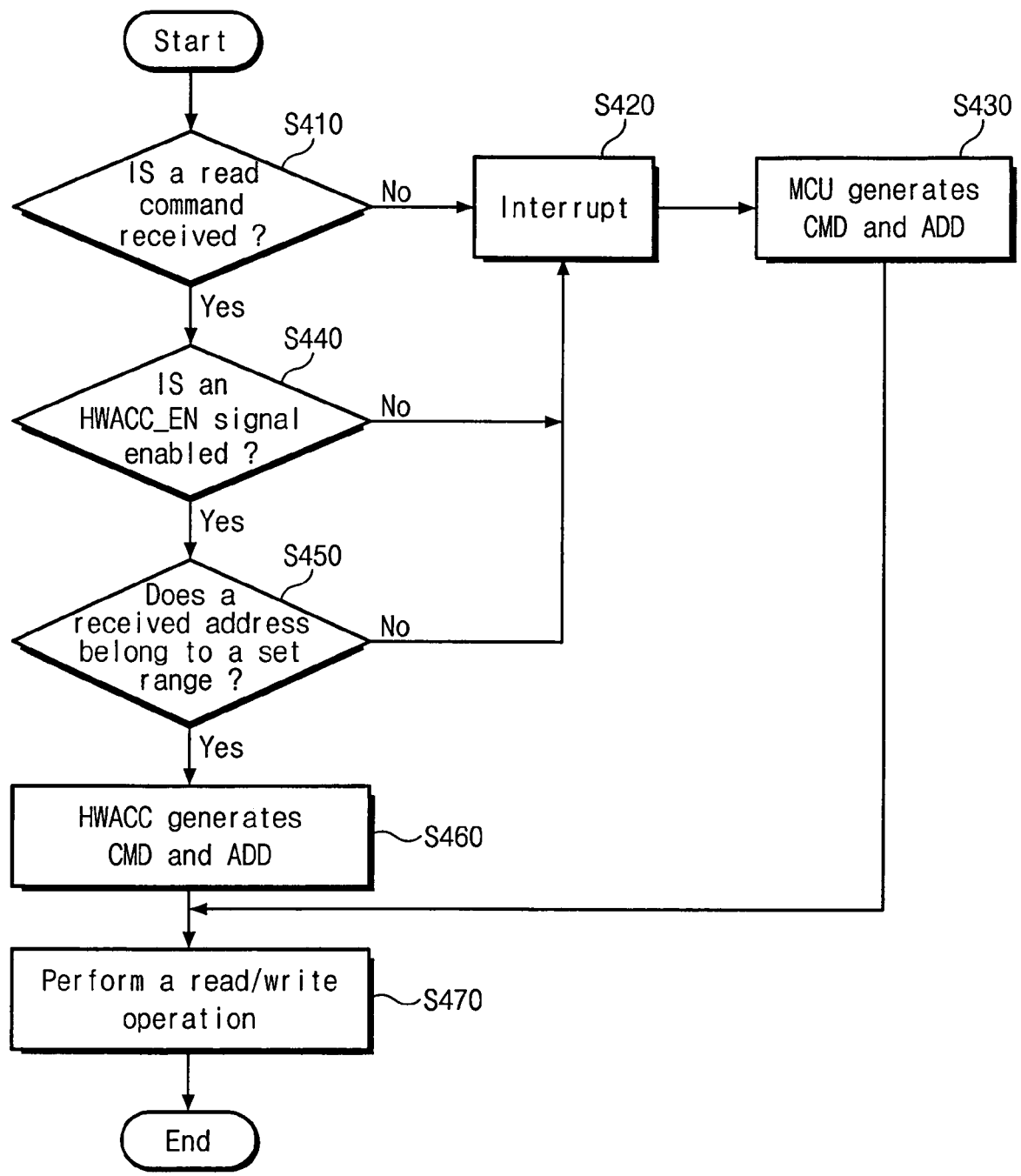
FIG. 5 is a flowchart illustrating a read/write operation of a memory card according to an embodiment of the present invention.

FIG. 5 is a flowchart illustrating read/write operations of memory card 100 according to an embodiment of present invention. The operation of memory card 100 is described below for the sequential read operating mode and the random read operating mode. In the description that follows, exemplary method steps are denoted by parentheses (XXX) to distinguish them from exemplary elements, such as those shown in FIGS. 1 through 4.

Referring to FIG. 5, current external address CUR_ADD and an input command are stored in command/address register 311 of host interface controller 310 and host interface controller 310 determines whether the input command is a read command (S410).

Where the input command not is not a read command, host interface controller 310 sets the interrupt flag in command/address register 311 (S420). Otherwise, where the input command is a read command, host interface controller determines whether the hardware acceleration flag in hardware accelerator 370 is set (S440). Where the hardware acceleration flag is not set, host interface controller 310 sets the interrupt flag (S420).

However, where the hardware acceleration flag is set, hardware accelerator 370 then determines whether address REQ_ADD output by selector 372 is within a previously defined address range stored in hardware accelerator 370 (S450). More specifically, hardware accelerator 370 determines whether new address REQ_ADD has the same memory block as the reference address, and a page address between a start page and an end page of the reference small block address. Where new address REQ_ADD is not within the address range stored in hardware accelerator 370, host interface controller 310 sets the interrupt flag in command/address register 311.

If the interrupt flag is set after one of steps S410, S440, or S450, MCU 320 converts current external address CUR_ADD into the first internal address (S430) and generates the first output command based on the input command. Otherwise, where the interrupt flag is not set after steps S410, S440, and S450, hardware accelerator 370 generates the second internal address and the second output command (S460).

Once the first or second internal address and output command are generated, memory controller 140 passes the first or second internal address and output command to flash memory module 120 through memory interface controller 360 to perform a read command or a write command (S470).

Steps S410 and S440 are carried out each time host system 200 sends a new read command to memory controller 140. Then, if a previous read command was sent to host system 200 without an intervening command, step S450 is carried out following step S440. Then, where possible, hardware accelerator 370 generates the current large block address according to step S460 so that MCU 320 does not have to perform address conversion.

Memory controller 140 operates similarly under the sequential read operating mode and the random read operating mode. However, in the random read operating mode, new address REQ_ADD is obtained from current external address CUR_ADD, and in the sequential read operating mode, new address REQ_ADD is obtained from next address NEXT_ADD. Also, in the sequential read operating mode, judgment circuit 373 operates when data read by a previous read operation is all transferred to host system 200.

Figure 6:
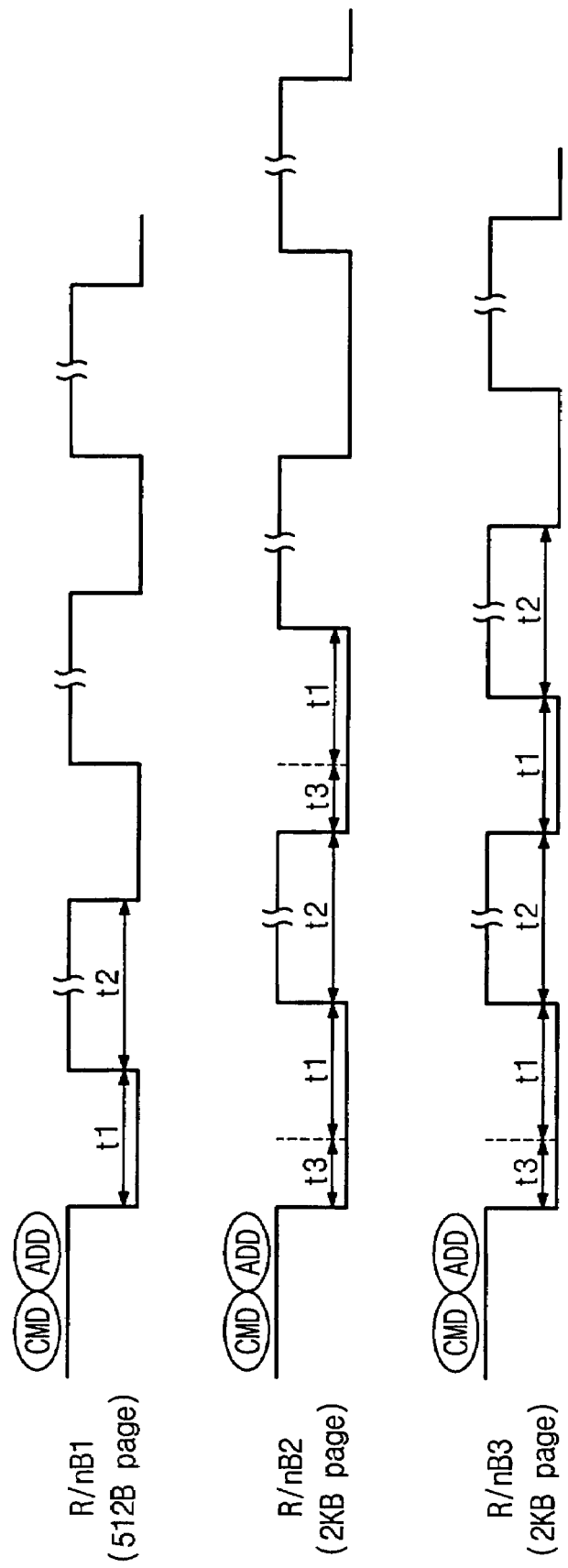
FIG. 6 is a diagram illustrating the timing of sequential read operations performed by memory cards with various memory controller configurations.
Figure 7:
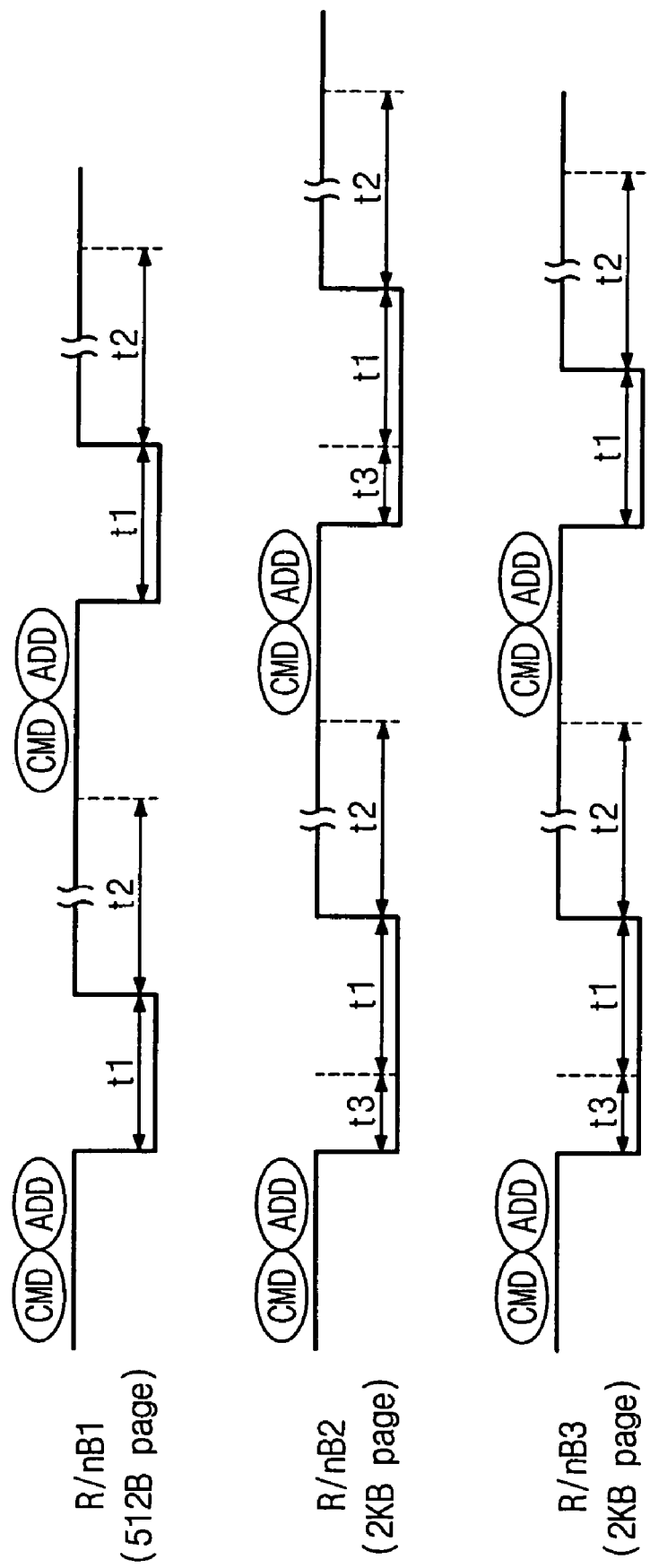
FIG. 7 is a diagram illustrating the timing of random read operations performed by memory cards with various memory controller configurations; and, FIG. 8 is a block diagram of a memory controller according to another embodiment of the invention.

FIGS. 6 and 7 show waveform timing diagrams illustrating performance advantages of using hardware accelerator 370 instead of always converting external addresses to internal addresses with MCU 320. FIG. 6 shows a waveform timing diagram for memory controller 140 during a sequential read operating mode, and FIG. 7 shows a waveform timing diagram for memory controller 140 during a random read operating mode.

Referring to FIG. 6, a first waveform R/nB1 illustrates the timing of memory controller 140 where host system 200 and flash memory module 120 both use small block addresses. In this case, there is no need to convert external addresses provided by host system 200 into internal addresses.

In first waveform R/nB1, memory controller 140 receives command/address data before a first high-to-low transition. Waveform R/nB1 then goes low for an interval "t1" while memory controller 140 accesses flash memory module 120 and transfers a page of data to memory buffer 380. Then, waveform R/nB1 goes high for an interval "t2" while memory buffer 380 transfers the page of data to host system 200. Since memory controller 140 is in the sequential read operating mode, several pages of data sequentially transferred from flash memory module 120 to host system 200 with a single transfer of command/address data.

Second and third waveforms R/nB2 and R/nB3 illustrate the timing of memory controller 140 where host system 200 uses small block addresses and flash memory module 120 uses large block addresses. In second waveform R/nB2, MCU 320 converts every external address received from host system 200 into an internal address, and in third waveform R/nB3, hardware accelerator 370 generates internal addresses wherever possible.

Second and third waveforms R/nB2 and R/nB3 are similar to waveform R/nB1, except that a delay "t3" occurs whenever MCU 320 is required to convert an external address into an internal address. In second waveform R/nB2, delay "t3" occurs every time a page is transferred from flash memory module 120 to memory buffer 380. However, in third waveform R/nB3, delay "t3" is eliminated by using hardware accelerator 370.

Referring to FIG. 7, first, second, and third waveforms R/nB1, R/nB2, and R/nB3 are slightly modified because memory controller 140 is in the random read operating mode. In waveform R/nB1, memory controller 140 receives command/address data before a first high-to-low transition. Waveform R/nB1 then goes low for an interval "t1" while memory controller 140 accesses flash memory module 120 and transfers a page of data to memory buffer 380. Then, waveform R/nB1 goes high for an interval "t2" while memory buffer 380 transfers the page of data to host system 200.

Once the page of data is transferred to host system 200, host system 200 transfers more command/address data to memory controller 140 before a next high-to-low transition of first waveform R/nB1. Again, a page of data is transferred from flash memory module 120 to memory buffer 380 during an interval "t1", and so forth.

In FIG. 7, second and third waveforms R/nB2 and R/nB3 are again similar to waveform R/nB1, except that delay "t3" occurs whenever MCU 320 is required to convert an external address into an internal address. In second waveform R/nB2, delay "t3" occurs every time a page is transferred from flash memory module 120 to memory buffer 380. However, in third waveform R/nB3, delay "t3" is eliminated by using hardware accelerator 370.

By eliminating the need to always perform address conversion using MCU 320, embodiments of the invention significantly improve the performance of memory card 100 in both the sequential read operating mode and the random read operating mode.

Figure 8:
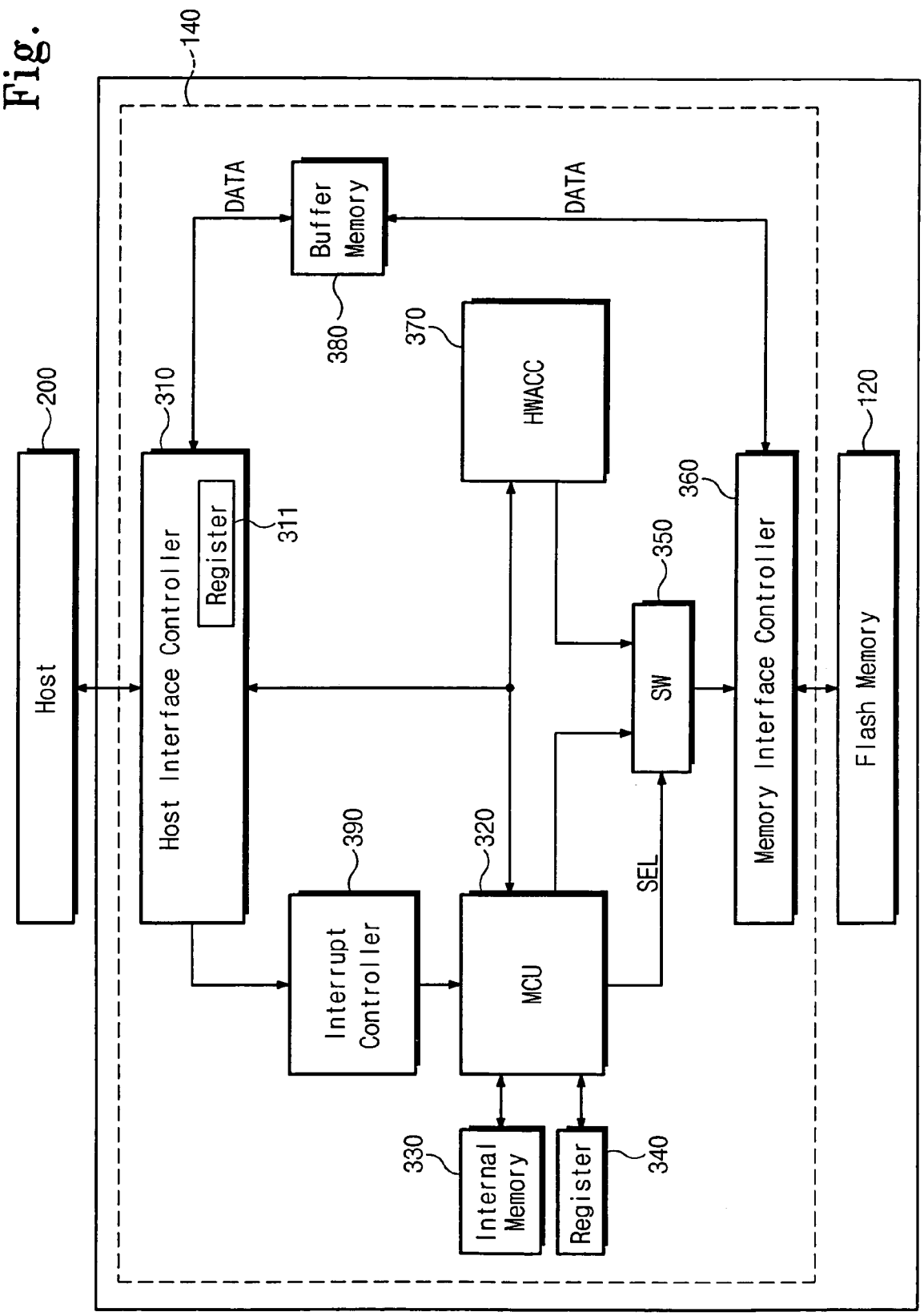

FIG. 8 shows a block diagram of memory controller 140 according to another embodiment of the invention. The memory controller illustrated in FIG. 8 is identical to that illustrated in FIG. 3 except that an interrupt controller 390 is added.

Interrupt controller 390 is configured to generate an interrupt signal when the interrupt flag is set in command/address register 311. When the interrupt signal is generated, MCU 320 performs address conversion as described above.

The foregoing preferred embodiments are teaching examples. Those of ordinary skill in the art will understand that various changes in form and details may be made to the exemplary embodiments without departing from the scope of the present invention which is defined by the following claims.

What is claimed:

1. A memory card, comprising:
a flash memory module, and
a memory controller receiving an external command and an external address comprising a memory block address and start and end page addresses, and controlling a read operation and a write operation applied to the flash memory module, the memory controller comprising:

a micro controller unit (MCU) converting the external address into a first internal address using a program stored in an internal memory associated with the MCU, and generating first command/address data in relation to the first internal address;

a hardware accelerator (HWACC) generating a second internal address based on the first internal address and the external address in response to activation of a read signal and an acceleration enable signal and further generating second command/address data in relation to the second internal address; and a switch receiving the first command/address data from the MCU and the second command/address data from the HWACC, selecting between and outputting either the first command/address data or the second command/address data to the flash memory module;

wherein the flash memory module reads data or writes data in response to the first command/address data or the second command/address data output by the switch, the MCU sets a hardware acceleration flag in the HWACC activating the acceleration enable signal after the flash memory module reads data using the first internal address, the HWACC activates the read signal whenever the external command received by the memory controller from the host system is associated with a read operation, the MCU transfers the external address to the HWACC after accessing the flash memory module in a read operation, and the HWACC comprises:

a register storing a value of the hardware acceleration flag and a reference address derived from the external address;

a selector circuit selecting between a current address and a next address in response to a mode signal and outputting the selected address as a new address;

a judgment circuit detecting whether the reference address and the new address have a same memory block address, and whether the new address has a page address between the start page address and an end page address of the reference address;

an address generator receiving the new address from the selector circuit and outputting the next address based on the new address; and, a state machine generating the second internal address based on the next address in response to the detection results received from the judgment circuit.

2. The memory card of claim 1, wherein upon generating the second internal address, the state machine sends a control signal to the address generator to cause the next address to be incremented by a predetermined value.

3. The memory card of claim 2, wherein the next address is stored in the register as the reference address.

4. The memory card of claim 1, wherein the selector circuit selects the current address when the mode signal indicates a random read operation and the next address when the mode signal indicates a sequential read operation.

5. The memory card of claim 1, wherein when the new address has a different memory block address from the reference address or the new address has a page address that is not between start and end page addresses of the reference address, the judgment circuit generates an interrupt signal causing an interrupt flag to be set in the memory controller.

6. A memory card, comprising:
a flash memory module, and
a memory controller receiving a sequential read command as an external command and an external address comprising a memory block address and start and end page addresses, and controlling a read operation and a write operation applied to the flash memory module, the memory controller comprising:
- a micro controller unit (MCU) converting the external address into a first internal address using a program stored in an internal memory associated with the MCU, and generating first command/address data in relation to the first internal address;
- a hardware accelerator (HWACC) generating a second internal address based on the first internal address and the external address in response to activation of a read signal and an acceleration enable signal and further generating second command/address data in relation to the second internal address; and
- a switch receiving the first command/address data from the MCU and the second command/address data from the HWACC, selecting between and outputting either the first command/address data or the second command/address data to the flash memory module;

wherein the MCU transfers the external address and the first internal address to the HWACC and the HWACC stores the external address as a reference address, the HWACC generates a next address based on the external address as a current address, the flash memory module reads data or writes data in response to the first command/address data or the second command/address data output by the switch, the MCU sets a hardware acceleration flag in the HWACC activating the acceleration enable signal after the flash memory module reads data using the first internal address, the HWACC activates the read signal whenever the external command received by the memory controller from the host system is associated with a read operation, and the HWACC determines whether the next address and the reference address have the same memory block address and whether the next address has a page address between the start and end page addresses of the reference address.

7. The memory card of claim 6, wherein the MCU transfers the external address to the HWACC and the HWACC stores the external address.

8. The memory card of claim 7, wherein the external address, the first internal address, and the second internal address each comprise:
- a memory block address, and a page address.

9. The memory card of claim 6, wherein upon determining that the next address and the reference address have the same memory block address, and that the next address has a page address between the start and end page addresses of the reference address, the HWACC generates the second internal address based on the external and the first internal address.

10. The memory card of claim 6, wherein upon determining that the next address and the reference address do not have the same memory block address, or that the next address does not have a page address between the start and end page addresses of the reference address, the HWACC activates an interrupt signal to set an interrupt flag in the memory controller, thereby causing the MCU to generate the first internal address.

11. A memory card, comprising:
a flash memory module, and
a memory controller receiving a current external command and a current external address from a host system, and controlling read/write operations applied to the flash memory module, the memory controller comprising:
- a micro controller unit (MCU) converting the current external address into a first internal address and generating first command/address data in relation to the first internal address;
- a hardware accelerator (HWACC) storing the current external address and a previous external address, generating a second internal address based on the first internal address and the current external address in response to the activation of a read signal and an acceleration enable signal, generating second command/address data in relation to the second internal address, and determining whether the current and previous external addresses have the same memory block address, and whether the previous external address has a page address between start and end page addresses associated with the current external address; and
- a switch receiving the first command/address data from the MCU and the second command/address data from the HWACC, and selecting between and outputting either the first command/address data or the second command/address data to the flash memory module;

wherein the flash memory module reads data or writes data in response to the first command/address data or the second command/address data output by the switch;

the MCU sets a hardware acceleration flag in the HWACC activating the acceleration enable signal after the flash memory module reads data using the first internal address;

the HWACC activates the read signal whenever the external command received by the memory controller from the host system is associated with a read operation.

12. The memory card of claim 11, wherein upon determining in the HWACC that the current and previous external addresses have the same memory block address and the previous external address has a page address between the start and end page addresses of the current external address, the HWACC generates the second internal address.

13. The memory card of claim 11, wherein upon determining in the HWACC that the current and previous external addresses do not have the same memory block address or that the previous external address does not have a page address between the start and end page addresses of the current external address, the HWACC circuit activates an interrupt signal to set an interrupt flag in the memory controller, thereby causing the MCU to generate the first internal address.

* * * * *